United States Patent
Stabile et al.

(10) Patent No.: US 11,104,202 B2
(45) Date of Patent: Aug. 31, 2021

(54) VEHICLE HVAC AIRFLOW SYSTEM

(71) Applicants: DENSO International America, Inc., Southfield, MI (US); Denso Corporation, Kariya (JP)

(72) Inventors: Kyle Stabile, Livonia, MI (US); Brian Belanger, Rochester Hills, MI (US); Nicholaus Spunar, Canton, MI (US); Xiaomin Chen, Troy, MI (US)

(73) Assignees: DENSO International America, Inc., Southfield, MI (US); Denso Corporation, Kariya (JP)

( * ) Notice: Subject to any disclaimer, the term of this patent is extended or adjusted under 35 U.S.C. 154(b) by 130 days.

(21) Appl. No.: 16/164,452

(22) Filed: Oct. 18, 2018

(65) Prior Publication Data
US 2020/0122546 A1 Apr. 23, 2020

(51) Int. Cl.
*F04D 29/44* (2006.01)
*B60H 1/00* (2006.01)
*F04D 17/10* (2006.01)

(52) U.S. Cl.
CPC ......... *B60H 1/00471* (2013.01); *F04D 17/10* (2013.01); *F04D 29/441* (2013.01)

(58) Field of Classification Search
CPC ...... F04D 29/44; F04D 29/441; F04D 29/444; B60H 1/00471
See application file for complete search history.

(56) References Cited

U.S. PATENT DOCUMENTS

| | | | | |
|---|---|---|---|---|
| 2,114,285 A | * | 4/1938 | Berger | F04D 29/444 415/204 |
| 3,374,831 A | * | 3/1968 | Sieverding | F04D 29/441 165/122 |
| 3,936,223 A | * | 2/1976 | Baghdadi | F04D 21/00 415/208.4 |
| 4,022,541 A | * | 5/1977 | Perrigo | F04D 29/441 415/207 |
| 4,767,285 A | * | 8/1988 | Jyoraku | F04D 25/06 417/366 |
| 4,991,646 A | | 2/1991 | Spears | |
| 6,123,506 A | * | 9/2000 | Brand | F04D 29/441 415/208.3 |
| 6,540,481 B2 | * | 4/2003 | Moussa | F01D 9/045 415/208.2 |
| 6,905,535 B2 | * | 6/2005 | Keefer | B01D 53/047 95/101 |

(Continued)

FOREIGN PATENT DOCUMENTS

| | | |
|---|---|---|
| JP | S55159952 U | 11/1980 |
| JP | 2006233877 A | 9/2006 |

(Continued)

*Primary Examiner* — Justin D Seabe
(74) *Attorney, Agent, or Firm* — Brooks Kushman P.C.

(57) ABSTRACT

A vehicle airflow system includes a centrifugal fan and an air diffuser. The centrifugal fan is configured to direct air radially outward from a rotational axis of the fan. The air diffuser has a plurality of air deflectors that are disposed radially about the fan. The air deflectors have curved surfaces. Each curved surface defines an airflow channel that has an inlet extending radially outward from a periphery of the centrifugal fan and an outlet extending axially away from the diffuser relative to the rotational axis of the fan.

11 Claims, 6 Drawing Sheets

(56) References Cited

U.S. PATENT DOCUMENTS

| | | | |
|---|---|---|---|
| 8,147,186 B2* | 4/2012 | Ibaraki | F04D 29/4206 |
| | | | 415/148 |
| 8,197,203 B2 | 6/2012 | Jairazbhoy et al. | |
| 9,810,239 B2 | 11/2017 | Hayamitsu | |
| 10,683,873 B1* | 6/2020 | Demski | F04D 29/441 |
| 2017/0096079 A1 | 4/2017 | Yokote et al. | |
| 2017/0102005 A1* | 4/2017 | Schuldt | F04D 17/10 |
| 2018/0163747 A1 | 6/2018 | Hayamitsu et al. | |
| 2019/0255905 A1 | 8/2019 | Tsumagari et al. | |

FOREIGN PATENT DOCUMENTS

| | | |
|---|---|---|
| JP | 2006342690 A | 12/2006 |
| JP | 2007192073 A | 8/2007 |
| JP | 2017227156 A | 12/2017 |

\* cited by examiner

VEHICLE HVAC AIRFLOW SYSTEM

TECHNICAL FIELD

The present disclosure relates to heating, ventilation, and air conditioning (HVAC) system for vehicles.

BACKGROUND

Vehicles may include HVAC systems that are configured to deliver air to the vehicle cabin. The HVAC systems of the vehicle may also be configured to control the temperature of the air within the vehicle cabin.

SUMMARY

A vehicle airflow system includes a centrifugal fan and an air diffuser. The centrifugal fan is configured to direct air radially outward from a rotational axis of the fan. The air diffuser has a plurality of air deflectors that are disposed radially about the fan. The air deflectors have curved surfaces. Each curved surface defines an airflow channel that has an inlet extending radially outward from a periphery of the centrifugal fan and an outlet extending axially away from the diffuser relative to the rotational axis of the fan.

An air diffusor includes a housing and a plurality of air deflectors. The housing defines an internal cavity that is configured to receive a centrifugal fan. The plurality of air deflectors is disposed internally within the housing and radially about the internal cavity. The air deflectors have curved surfaces. Each curved surface defines an airflow channel that has an inlet extending radially outward from the internal cavity and an outlet extending axially away from the internal cavity.

An airflow system includes a centrifugal fan and an air diffuser. The centrifugal fan is configured to direct air radially outward from a rotational axis of the fan. The air diffuser has a plurality of air deflectors that are disposed radially about the fan. The air deflectors have curved surfaces that extend radially inward toward the fan along a first end and substantially parallel to the rotational axis along a second end. The first end of each curved surfaces is adjacent to an outer periphery of the fan.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
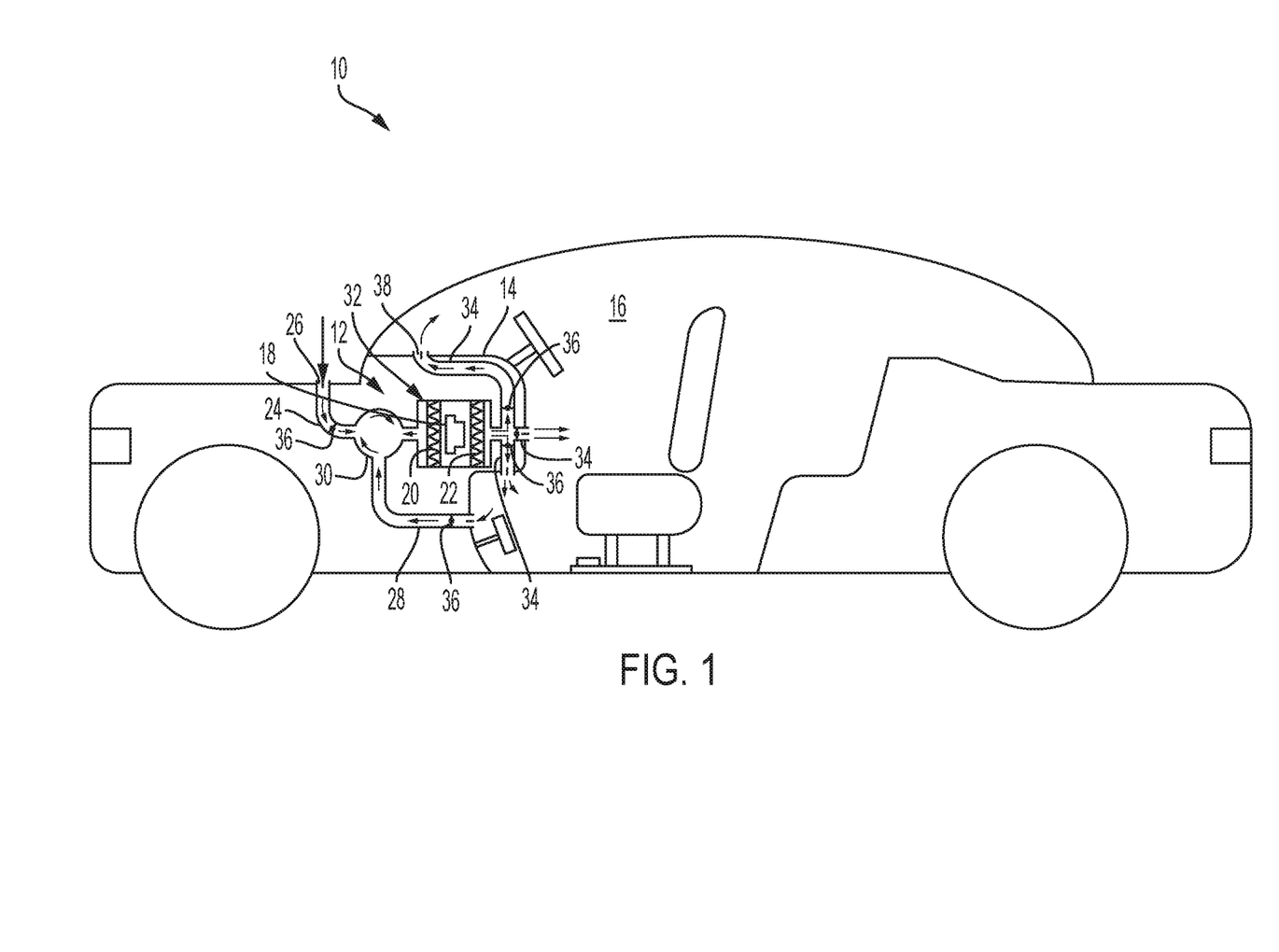
FIG. 1 is a schematic illustration of an exemplary vehicle and an exemplary HVAC system of a vehicle.

Referring to FIG. 1, an exemplary vehicle 10 and an exemplary HVAC system 12 (or airflow system) of the vehicle 10 are illustrated. Some components of the HVAC system 12 may be disposed behind a dashboard 14 of the vehicle 10. However, some the components may be disposed at other locations within the vehicle. The HVAC system 12 is configured to deliver air to a cabin 16 of the vehicle 10. The HVAC system 12 may be configured to condition the air (e.g., heat, cool, dry, etc.) prior to delivering the air to the vehicle cabin 16.

A blower or fan 18 is configured to draw air into the HVAC system 12 and to direct the air across one or more heat exchangers in order to condition the air being delivered to the vehicle cabin 16 prior to delivering the air to the vehicle cabin 16. The fan 18 may be any type of centrifugal fan. For example, the fan 16 may be a turbo centrifugal fan. The fan 18 may include an electric motor (not shown) that is configured to turn the blades of the fan 18. The electric motor of the fan 18 may draw power from any electrical power source of the vehicle 10. For example, the electric motor of the fan 18 may draw power from a battery or an onboard generator (e.g., an alternator).

A first of the heat exchangers may be an evaporator 20 that is configured to cool and dry the air prior to delivering the air to the vehicle cabin 16. The evaporator 20 cools and dries the air by transferring heat from the air to a refrigerant that is flowing through the evaporator 20 as the air flows across the evaporator 20. The evaporator 20 may be a subcomponent of an air-conditioning system. More specifically, the evaporator 20 may be a subcomponent of a refrigerant loop that also includes a compressor, a condenser, and a thermal expansion valve.

A second of the heat exchangers may be a heater core 22 that is configured to warm the air prior to delivering the air to the vehicle cabin 16. The heater core 22 warms the air by transferring heat from a coolant flowing through the heater core 22 into the air as the air flows across the heater core 22. The heater core 22 may be a subcomponent of a coolant loop that also includes a pump to circulate the fluid through the coolant loop and a heat source that is configured to heat the coolant within the coolant loop. If the vehicle 10 is powered by an internal combustion engine, the heat source of the coolant loop may be the engine. If the vehicle 10 is not powered by an internal combustion engine (e.g., an electric vehicle that is powered by an electric motor) the heat source of the coolant loop may be an electric heater that is powered by a battery or any other electrical power source of the vehicle 10 (e.g., an alternator). It should be noted that the heater core 22 may be operated while the evaporator 20 is shut down to heat the air being delivered into the vehicle cabin 16, the evaporator 20 may be operated while the heater core 22 is shut down to cool and dry the air being delivered into the vehicle cabin 16, or the evaporator 20 and heater core 22 may be operated simultaneously to first cool and dry the air followed by heating the air being delivered into the vehicle cabin 16.

The HVAC system 12 may include a series of interconnected ducts that are configured to channel the air to the evaporator 20, heater core 22, and eventually to the cabin 16 of the vehicle 10. A first duct 24 is configured to channel ambient air surrounding the vehicle 10 from an air intake 26 into the HVAC system 12. More specifically, the first duct 24 is configured to channel the ambient surrounding air to the evaporator 20, heater core 22, and eventually to the cabin 16 of the vehicle 10. The first duct 24 may be referred to as a fresh air duct and the air intake 26 may be referred to as a fresh air intake.

A second duct 28 is configured to channel air from within the cabin 16 of the vehicle 10 back into the HVAC system 12. More specifically, the second duct 28 is configured to channel air from within the cabin 16 of the vehicle 10 to the evaporator 20, heater core 22, and eventually back into to the cabin 16 of the vehicle 10. The air being channeled from the cabin 16 of the vehicle 10 back into the HVAC system 12 may be referred to as recirculated air. The second duct 28 may be referred to as a recirc air duct.

The recirculated air and the ambient air entering the HVAC system 12 may each be directed to a common duct or mixing chamber 30 where the recirculated air and the ambient air are mixed. The mixed air is then delivered to an additional duct or conditioning chamber 32 where the air is cooled and/or heated via the evaporator 20 and/or the heater core 22, respectively. The fan 18 may also be disposed within the conditioning chamber 32. The air then exits the conditioning chamber 32 and enters the vehicle cabin 16 through various outlet ducts 34. The various outlet ducts 34 may be configured to deliver air to specific areas within the cabin 16. For example, a first of the outlet ducts 34 may be configured to deliver into the cabin 16 by directing air downward and toward the floor of the cabin 16, a second of the outlet ducts 34 may be configured to deliver into the cabin 16 by directing air upward and toward the inner surface of the windshield of the vehicle 10, and a third of the outlet ducts 34 may be configured to deliver into the cabin 16 by directing the air horizontally toward the passengers within the vehicle 10. Doors or shutters 36 may disposed within any of the ducts (e.g., first duct 24, second duct 28, outlet ducts 34) that restrict air flow to specific ducts, intakes, outlets, etc. The inlets to and/or outlets from any of the ducts (e.g., first duct 24, second duct 28, outlet ducts 34) may include louvers or shutters that restrict or direct the air entering or exiting the ducts.

It should be understood that the schematic illustrated in FIG. 1 is merely exemplary and is not intended to be limiting. Other HVAC configurations are contemplated that utilize ducts to channel ambient air and/or recirculated air into the HVAC system where the air is conditioned and then delivered to the cabin of the vehicle. For example, the HVAC system may include multiple ambient air intakes, multiple recirc air ducts, etc., or the positioning the air intakes or ducts within the vehicle may be rearranged. Furthermore, the number of heat exchangers may be different (e.g., the HVAC system may not include an evaporator if the vehicle does not include a cabin air cooling system) and the spatial positioning of the heat exchangers (e.g., evaporator 20 and heater core 22) and fan 18 may be rearranged.

Figure 2:
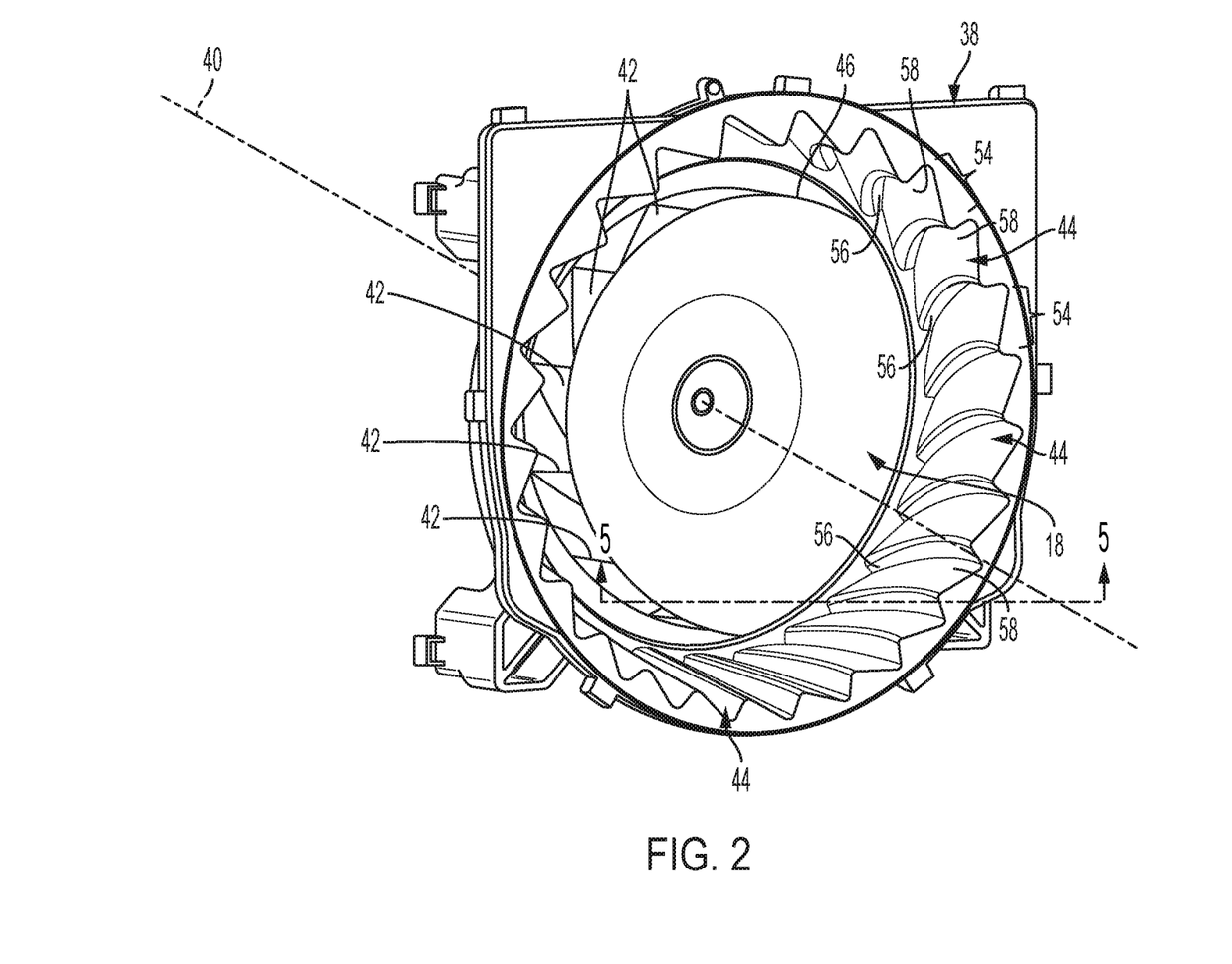
FIG. 2 is a perspective view of a centrifugal fan and an air diffuser for the HVAC system.

Referring to FIG. 2, the centrifugal fan 18 and an air diffuser 38 are illustrated. The centrifugal fan 18 is disposed with in the air diffuser 38. The centrifugal fan 18 is configured to direct air radially outward from a rotational axis 40 of the centrifugal fan 18. More specifically, blades 42 of the centrifugal fan 18 are configured to direct air radially outward from the rotational axis 40 of the centrifugal fan 18 when the centrifugal fan 18 is rotated about the rotational axis 40 by an actuator, such as an electric motor (not shown). The air diffuser 38 has a plurality of air deflectors 44 that are disposed radially around or about an outer periphery, outer diameter, or outer perimeter 46 of the centrifugal fan 18 when the centrifugal fan 18 is disposed with in the air diffuser 38.

Figure 3:
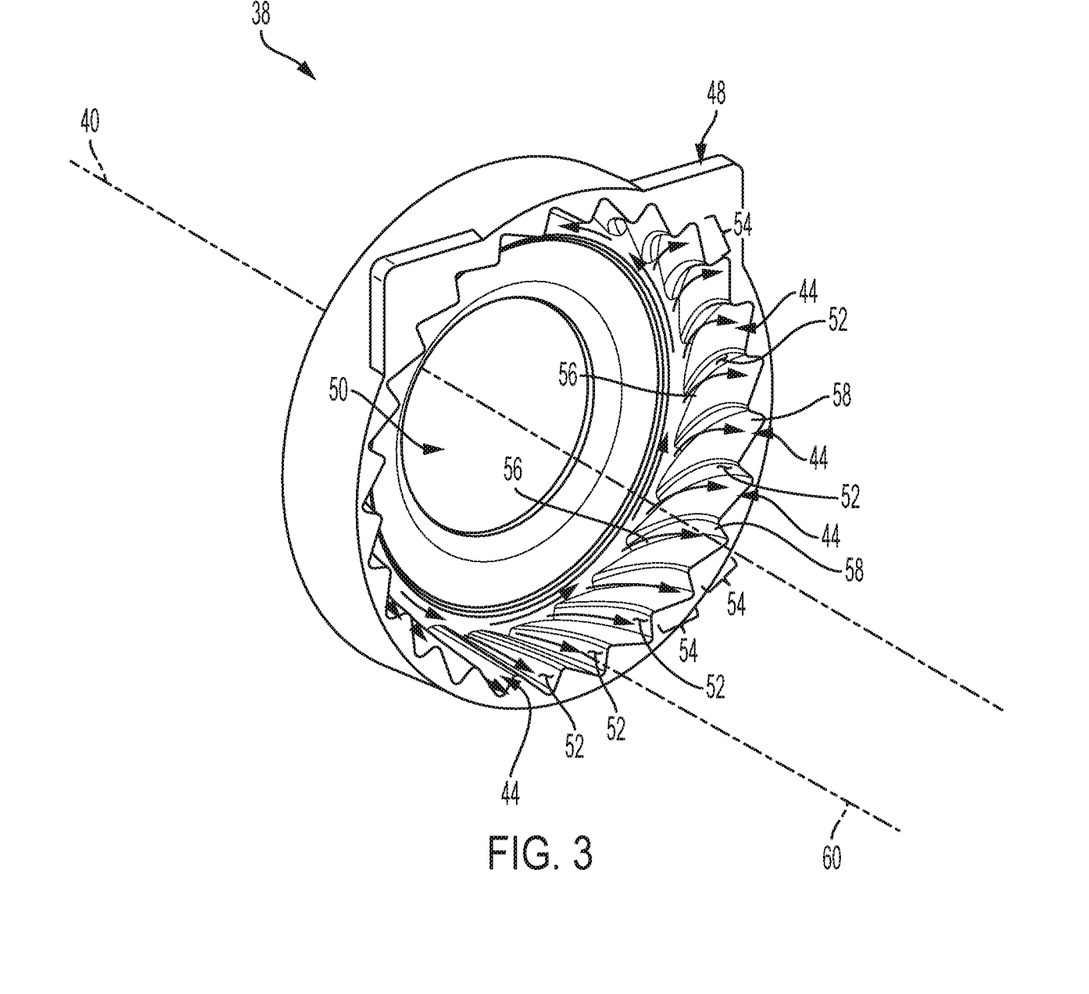
FIG. 3 is a perspective view of the air diffuser.

Referring to FIG. 3, the air diffuser 38 is illustrated in further detail. The air diffuser 38 includes a housing 48 the defines an internal cavity 50 that is configured to receive the centrifugal fan 18. The plurality of air deflectors 44 are disposed internally within the housing 48 and radially around or about the internal cavity 50. Each of the air deflectors 44 includes a curved surface 52. Each of the curved surfaces 52 defines an airflow channel 54 that has an inlet 56 that extends radially outward from the internal cavity 50 and an outlet 58 that extends axially away from the internal cavity 50. Returning to FIG. 2, each the inlets 56 of the airflow channels 54 defined by the curved surfaces 52 extend radially outward from the outer perimeter 46 of the centrifugal fan 18, while each of the outlets 58 of the airflow channels 54 defined by the curve surfaces 52 extend axially away from the centrifugal fan 18 relative to the rotational axis 40 of the centrifugal fan 18. More specifically, the curve surfaces 52 extend radially inward toward the centrifugal fan 18 along first ends that are adjacent to the outer perimeter 46 of the centrifugal fan 18 to define the inlets 56 of the airflow channels 54 and substantially parallel to the rotational axis 40 of the centrifugal fan 18 along second ends to define the outlets 58 of the airflow channels 54. Line 60 depicted in FIG. 3 illustrates how the second ends of the curve surfaces 52, and therefore the outlets 58 of the airflow channels 54, are substantially parallel to the rotational axis 40 of the centrifugal fan 18. Substantially parallel may refer to any incremental value between plus or minus 30° from exactly parallel.

Figure 4:
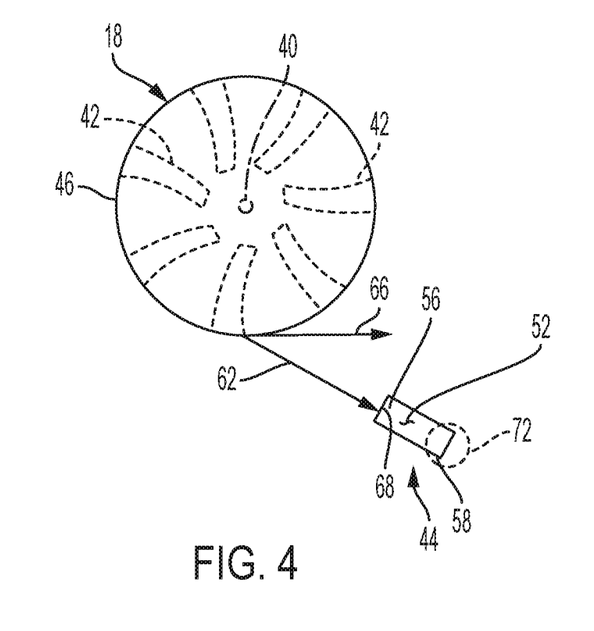
FIG. 4 is a top view of the centrifugal fan and one of the plurality of air deflectors illustrating the air flow from the centrifugal fan into the air deflector.
Figure 5:
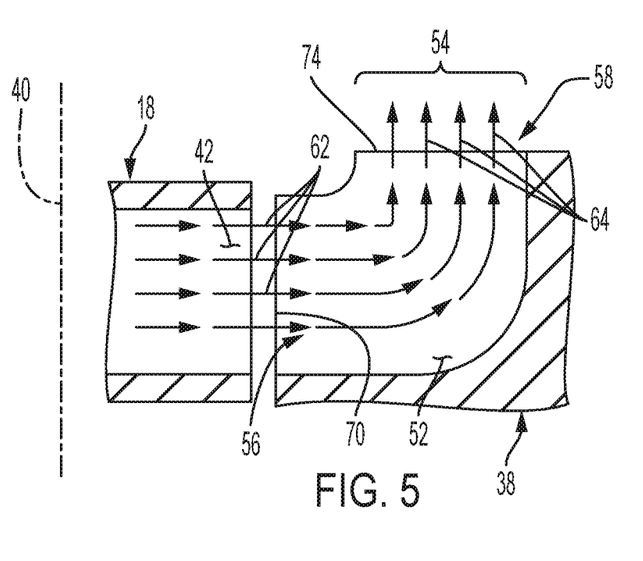
FIG. 5 is a partial side cross-sectional view of the centrifugal fan and one of the plurality air deflectors illustrating the direction of the air flow from the centrifugal fan and through the air deflector.

Referring to FIGS. 4 and 5, a top view and a partial side cross-sectional view of the centrifugal fan 18 one of the plurality air deflectors 44 illustrating the direction of the air flow from the centrifugal fan 18 and through the air deflector 44 are illustrated, respectively. The air flowing from the centrifugal fan 18 and through one of the plurality of air deflectors 44 illustrated in FIGS. 4 and 5 may be representative of the airflow from the centrifugal fan 18 and through each of the air deflectors 44 of the plurality of air deflectors 44. The air flowing radially off the centrifugal fan 18 and into the inlet 56 of the airflow channel 54 is illustrated by arrow 62 in FIG. 4 and arrows 62 in FIG. 5. The air flowing out of the outlet 58 of the airflow channel 54, that is substantially parallel to the rotational axis 40 of the centrifugal fan 18 is illustrated by arrows 64 in FIG. 5. It should be noted that the position of the rotational axis 40 of the centrifugal fan 18 may have been adjusted in FIG. 5 relative to the actual position of the rotational axis 40 for illustrative purposes. The arrows that are disposed between the arrows 62 at the inlet 56 and the arrows 64 at the outlet 58 illustrate the transition of the airflow from radially outward relative to the centrifugal fan 18 to substantially parallel to the rotational axis 40 of the centrifugal fan 18.

A tangent from the outer perimeter 46 of the centrifugal fan 18 is illustrated by arrow 66. The air flowing radially off of the centrifugal fan 18 and into the inlet 56 of the airflow channel 54, which is illustrated by arrow 62, is displaced from the tangent from the outer perimeter 46 of the centrifugal fan 18, which is illustrated by arrow 66, at any angle that ranges between 0° and 45°. The orientation of the curved surface 52 at the inlet 56 is substantially parallel to the air flowing radially off of the centrifugal fan 18, which is illustrated by arrow 62, while the orientation of the curved surface 52 at the outlet 58 is substantially parallel to the rotational axis 40 of the centrifugal fan 18. A cross-sectional area of the inlet 56 to the airflow channel 54 that is bound by line 68 in FIG. 4 and line 70 in FIG. 5 is substantially perpendicular to the air flowing radially off of the centrifugal fan 18 and into the inlet 56, which is illustrated by arrow 62. A cross-sectional area of the outlet 58 to the airflow channel 54 that is located approximately in area 72 in FIG. 4 and is bound by line 74 in FIG. 5 is substantially perpendicular to the air flowing out of the outlet 58, which is illustrated by arrows 64. Substantially perpendicular may refer to any incremental value between plus or minus 35° from exactly perpendicular.

Figure 6:
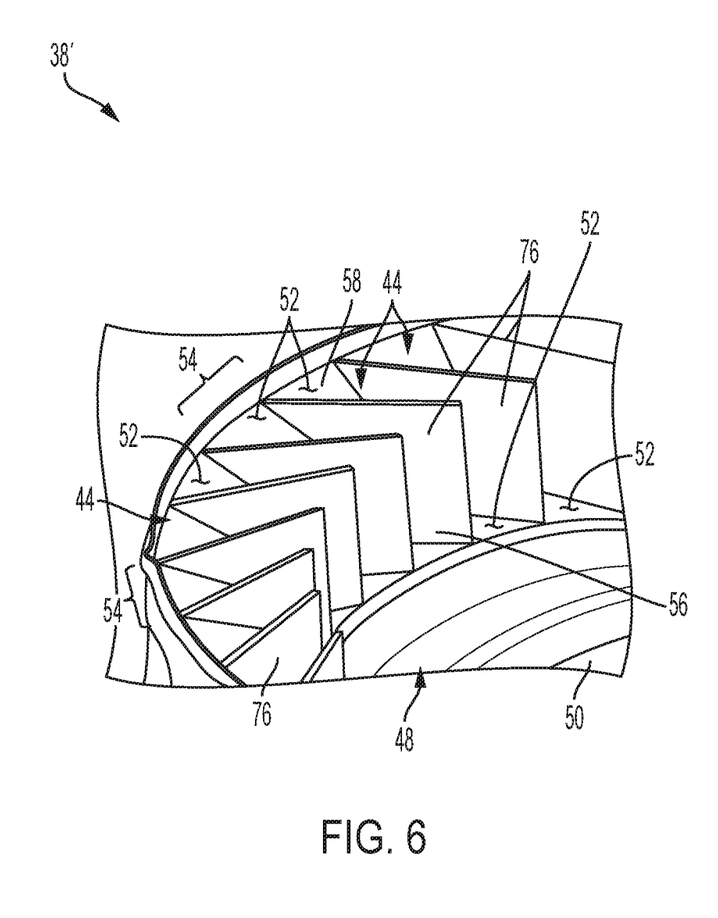
FIG. 6 is a partial view of a first alternative embodiment of the air diffuser.

Referring to FIG. 6, a partial view of a first alternative embodiment of the air diffuser 38' is illustrated. The first alternative embodiment of the air diffuser 38' should be construed to include all of the features, characteristics, functionality, etc. of air diffuser 38 unless otherwise stated herein. Air diffuser 38' includes the air deflectors 44 that are disposed internally within the housing 48 and radially around or about the internal cavity 50 defined by the housing 48. Each of the air deflectors 44 includes one of the curved surfaces 52 that defines an airflow channel 54 that has an inlet 56 that extends radially outward from the internal cavity 50 (and centrifugal fan 18) and an outlet 58 that extends axially away from the internal cavity 50 (and axially away from the centrifugal fan 18 relative to the rotational axis 40 of the centrifugal fan 18). Air diffuser 38', however, additionally includes divider walls 76 that partially define the airflow channels 54, and that partition adjacent curved surfaces 52 and adjacent airflow channels 54. The divider walls 76 may extend all the way from the inlets 56 of the airflow channels 54 to the outlets 58 of the airflow channels 54. The divider walls 76 may be configured to reduce turbulence within the airflow channels 54.

Figure 7:
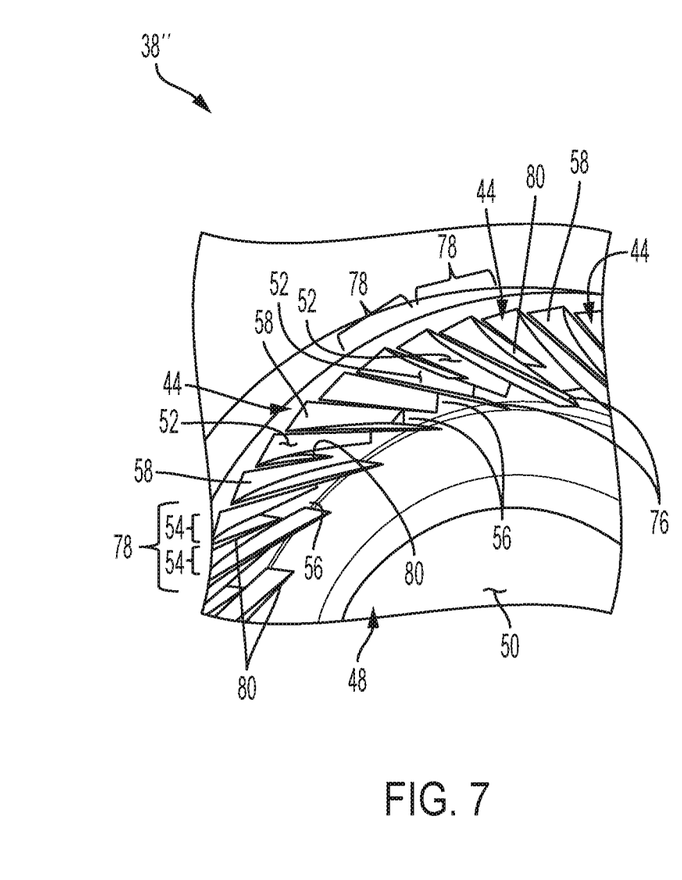
FIG. 7 is a partial view of a second alternative embodiment of the air diffuser.

Referring to FIG. 7, a partial view of a second alternative embodiment of the air diffuser 38" is illustrated. The second alternative embodiment of the air diffuser 38" should be construed to include all of the features, characteristics, functionality, etc. of air diffuser 38 unless otherwise stated herein. Air diffuser 38" includes the air deflectors 44 that are disposed internally within the housing 48 and radially around or about the internal cavity 50 defined by the housing 48. Each of the air deflectors 44 includes one of the curved surfaces 52 that defines an airflow channel 54 that has an inlet 56 that extends radially outward from the internal cavity 50 (and centrifugal fan 18) and an outlet 58 that extends axially away from the internal cavity 50 (and axially away from the centrifugal fan 18 relative to the rotational axis 40 of the centrifugal fan 18). Air diffuser 38", however, additionally includes the divider walls 76 that partially define the airflow channels 54. The divider walls 76 in air diffuser 38", however, partition adjacent pairs 78 of curved surfaces 52 and adjacent pairs of airflow channels 54. The air diffuser 38" further includes ribs 80 that partially divide the curved surfaces 52 within a pair 78 of curved surfaces 52. The ribs 80 may be similar to the divider walls 76 with the exception that the ribs 80 are shorter in length than the divider walls 76 such that the ribs 80 only extend from a central portion of the airflow channels 54 to the outlets 58 (i.e., unlike the divider walls 76, the ribs 80 do not extend all the way from the inlets 56 of the airflow channels 54 to the outlets 58 of the airflow channels 54). The ribs 80 may also be configured to reduce turbulence within the airflow channels 54.

Figure 8:
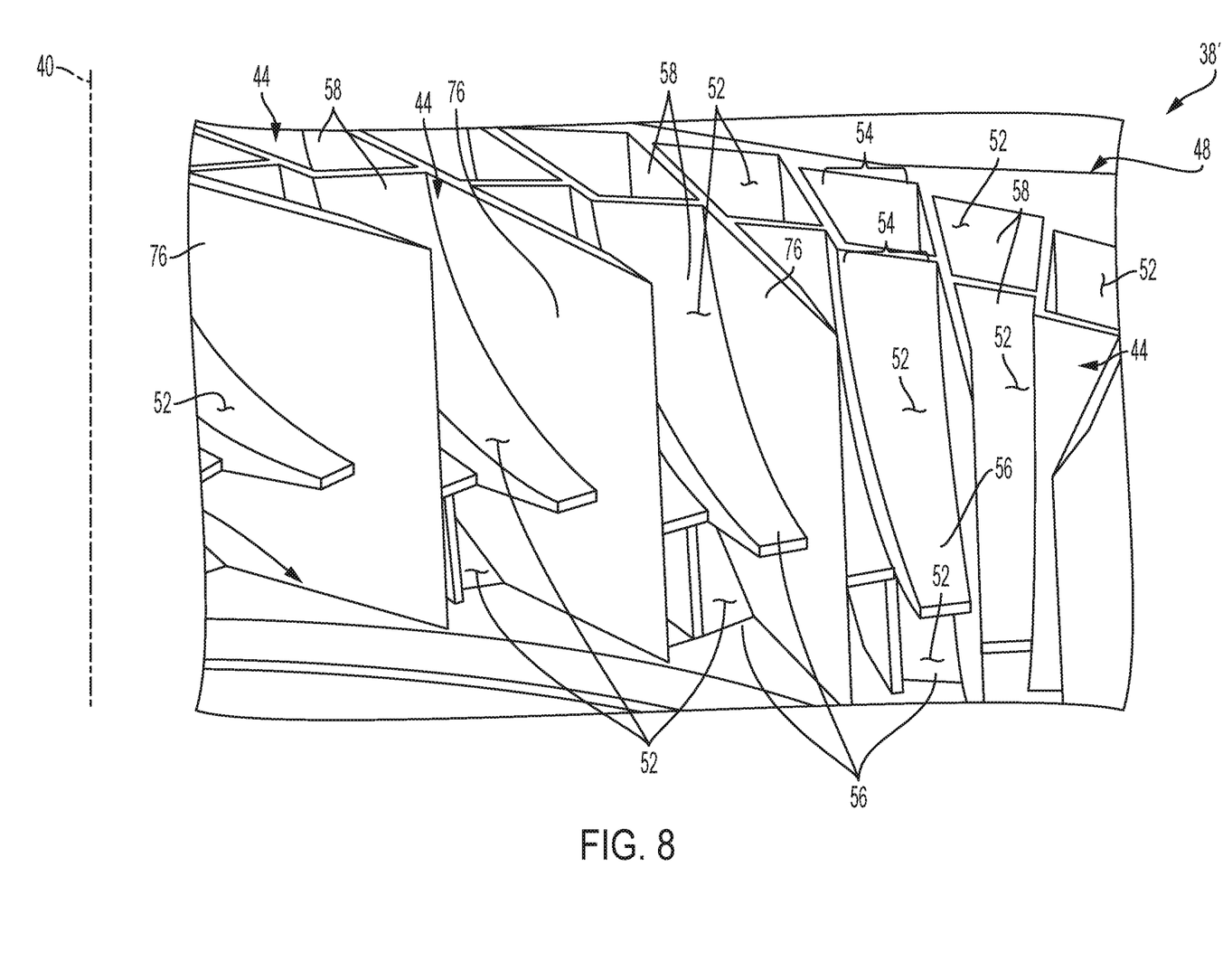
FIG. 8 is a partial view of a third alternative embodiment of the air diffuser.

Referring to FIG. 8, a partial view of a third alternative embodiment of the air diffuser 38''' is illustrated. The third alternative embodiment of the air diffuser 38''' should be construed to include all of the features, characteristics, functionality, etc. of air diffuser 38 unless otherwise stated herein. Air diffuser 38''' includes the air deflectors 44 that are disposed internally within the housing 48 and radially around or about the internal cavity 50 defined by the housing 48. Each of the air deflectors 44 includes one of the curved surfaces 52 that defines an airflow channel 54 that has an inlet 56 that extends radially outward from the internal cavity 50 (and centrifugal fan 18) and an outlet 58 that extends axially away from the internal cavity 50 (and axially away from the centrifugal fan 18 relative to the rotational axis 40 of the centrifugal fan 18).

Air diffuser 38''' also includes the divider walls 76 that partially define the airflow channels 54, and that partition adjacent pairs of curved surfaces 52 and pairs adjacent airflow channels 54. Alternatively, the divider walls may simply partition adjacent curved surfaces 52 and adjacent airflow channels 54 as opposed to adjacent pairs of curved surfaces 52 and adjacent pairs of airflow channels 54. Air diffuser 38''', however, additionally includes two or more layers of curved surfaces 52 and airflow channels 54 that are stacked axially relative to the internal cavity 50 (and axially relative to the rotational axis 40 of the centrifugal fan 18). It should be noted that the position of the rotational axis 40 of the centrifugal fan 18 may have been adjusted in FIG. 8 relative to the actual position of the rotational axis 40 for illustrative purposes. Also, the divider walls 76 partition adjacent sets of curved surfaces 52 and adjacent sets of airflow channels 54. An adjacent set of curved surfaces 52 and airflow channels 54 may refer to a single column of curved surfaces 42 and airflow channels 54 or several columns of curved surfaces 52 and airflow channels 54.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle ventilation system comprising:
a centrifugal fan configured to direct air radially outward from a rotational axis of the fan; and
an air diffuser having a plurality of air deflectors disposed radially about the fan, the air deflectors having curved surfaces, each curved surface defining an airflow channel that has an inlet extending radially outward from a periphery of the centrifugal fan and an outlet extending substantially parallel to the rotational axis of the fan, wherein the curved surfaces are comprised of two or more layers of curved surfaces that are stacked and aligned in columns that extend in a direction that is substantially parallel to the rotational axis of the fan, wherein the curved surfaces in each column define separate airflow channels, wherein the two or more layers of curved surfaces are stacked such that the curved surfaces in each column are substantially parallel relative to each other from the inlets to the outlets of the airflow channels in each respective column, wherein the air diffuser further comprises primary divider walls that partition the curved surfaces into sets of four curved surfaces, and wherein each set of four curved surfaces forms two of the columns, a top row, and a bottom row.

2. The vehicle ventilation system of claim 1, wherein cross-sectional areas of the inlets are oriented substantially perpendicular to the air flowing radially outward from the fan.

3. The vehicle ventilation system of claim 1, wherein the curved surfaces in each bottom row in each set of four curved surfaces are partitioned by a secondary divider wall that is shorter in length than the primary divider walls.

4. The vehicle ventilation system of claim 3, wherein the curved surfaces in each top row in each set of four curved surfaces are offset and not partitioned relative to each other.

5. An air diffuser comprising:
a housing defining an internal cavity configured to receive a centrifugal fan; and
a plurality of air deflectors disposed internally within the housing and radially about the internal cavity, the air deflectors having curved surfaces, each curved surface defining an airflow channel that has an inlet extending radially outward from the internal cavity and an outlet extending substantially parallel to a rotational axis of the fan, wherein the curved surfaces are comprised of two or more layers of curved surfaces that are stacked and aligned in columns that extend in a direction that is substantially parallel to the rotational axis of the fan, wherein the curved surfaces in each column define separate airflow channels, wherein the two or more layers of curved surfaces are stacked such that the curved surfaces in each column are substantially parallel relative to each other from the inlets to the outlets of the airflow channels in each respective column; and
primary divider walls that partition the curved surfaces into sets of four curved surfaces, wherein each set of four curved surfaces forms two of the columns, a top row, and a bottom row.

6. The air diffuser of claim 5, wherein cross-sectional areas of the inlets are oriented substantially perpendicular to the air flowing radially outward from the fan.

7. The air diffuser of claim 5, wherein the curved surfaces in each bottom row in each set of four curved surfaces are partitioned by a secondary divider wall that is shorter in length than the primary divider walls.

8. The air diffuser of claim 7, wherein the curved surfaces in each top row in each set of four curved surfaces are offset and not partitioned relative to each other.

9. An airflow system comprising:
a centrifugal fan configured to direct air radially outward from a rotational axis of the fan; and
an air diffuser having a plurality of air deflectors disposed radially about the fan, the air deflectors having curved surfaces that extend radially inward toward the fan along a first end and substantially parallel to the rotational axis along a second end, the first end being adjacent to an outer periphery of the fan, wherein the curved surfaces are comprised of two or more layers of curved surfaces that are stacked and aligned in columns that extend in a direction that is substantially parallel to the rotational axis of the fan, wherein the curved surfaces in each column define separate airflow channels, wherein the two or more layers of curved surfaces are stacked such that the curved surfaces in each column are substantially parallel relative to each other from the first end to the second end in each respective column, wherein the air diffuser further comprises primary divider walls that partition the curved surfaces into sets of four curved surfaces, and wherein each set of four curved surfaces forms two of the columns, a top row, and a bottom row.

10. The airflow system of claim 9, wherein the curved surfaces in each bottom row in each set of four curved surfaces are partitioned by a secondary divider wall that is shorter in length than the primary divider walls.

11. The airflow system of claim 10, wherein the curved surfaces in each top row in each set of four curved surfaces are offset and not partitioned relative to each other.

* * * * *